United States Patent
Kashima et al.

(10) Patent No.: US 7,716,419 B2
(45) Date of Patent: May 11, 2010

(54) STORAGE SYSTEM AND LOAD BALANCING METHOD THEREOF

(75) Inventors: Takayuki Kashima, Odawara (JP); Masafumi Nozawa, Odawara (JP); Kyosuke Achiwa, Yamato (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 11/341,720

(22) Filed: Jan. 30, 2006

(65) Prior Publication Data

US 2007/0124535 A1 May 31, 2007

(30) Foreign Application Priority Data

Nov. 28, 2005 (JP) .............................. 2005-342643

(51) Int. Cl.
*G06F 12/00* (2006.01)
(52) U.S. Cl. ...................... 711/114; 711/163; 711/203; 709/235; 714/6
(58) Field of Classification Search .................. 711/114
See application file for complete search history.

(56) References Cited

U.S. PATENT DOCUMENTS 7,290,168 B1 * 10/2007 DeKoning ..................... 714/9
7,363,418 B1 * 4/2008 Westin et al. .................. 711/4
2003/0204597 A1 10/2003 Arakawa et al.
2005/0071559 A1 3/2005 Tamura et al.
2005/0114464 A1 * 5/2005 Amir et al. .................. 709/213
2005/0120174 A1 6/2005 Uratani et al.

FOREIGN PATENT DOCUMENTS

| JP | 2003-316522 | 4/2002 |
| JP | 2005-107645 | 9/2003 |
| JP | 2005-165444 | 11/2003 |

* cited by examiner

*Primary Examiner*—Christian P Chace
*Assistant Examiner*—Matthew Bradley
(74) *Attorney, Agent, or Firm*—Foley & Lardner LLP

(57) ABSTRACT

Provided is a computer system having a host computer that requests the input and output of data in and from an actual storage volume, and a plurality of storage subsystems respectively having at least one or more virtual storage volumes. The virtual storage volumes of each of the plurality of storage subsystems are virtualizations of a common external volume. The host computer sets a certain logical path among a plurality of logical paths to be respectively connected to a plurality of virtual storage volumes formed by virtualizing the common external volume as an alternate path of another logical path.

10 Claims, 17 Drawing Sheets

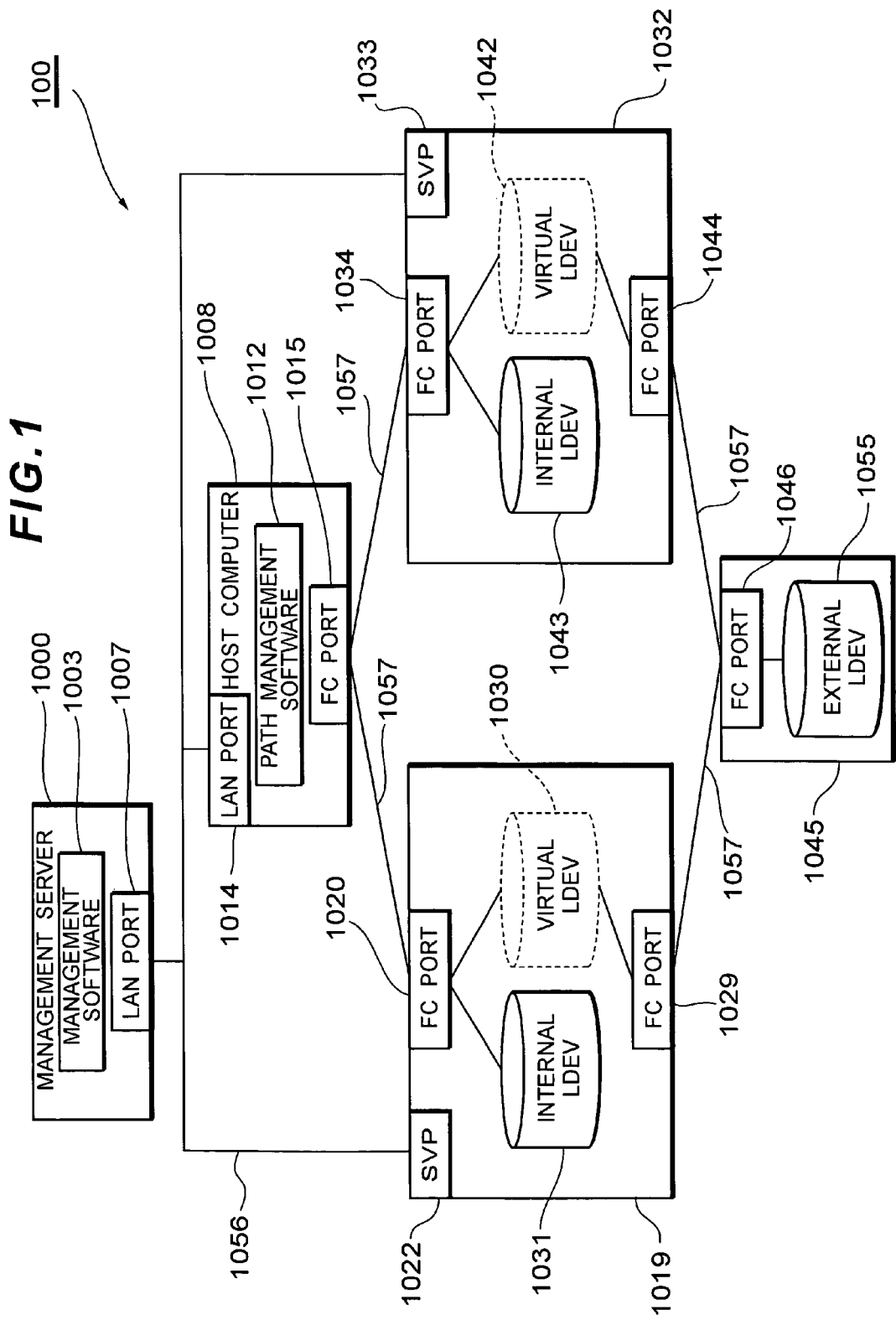

FIG.4

HOST MANAGEMENT TABLE 1004

| HOST ID | HOST NAME | IP ADDRESS | USER NAME | PASSWORD |
|---|---|---|---|---|
| 00000000 | Mustang | 192.168.0.10 | Administrator | * * * * * |
| 00000001 | Golf | 192.168.0.11 | Administrator | * * * |
| 00000002 | Polo | 192.168.0.22 | Administrator | * * * * * |
| ...... | | | | |
| | | | | |

FIG.5

LOGICAL PATH MANAGEMENT TABLE 1005

| HOST ID | PATH ID | GUID | DKCID | PATH STATUS |
|---|---|---|---|---|
| 00000000 | 00000000 | 00000000 | 00000000 | Active |
| 00000000 | 00000001 | 00000001 | 00000001 | Active |
| 00000000 | 00000002 | 00000002 | 00000000 | Active |
| 00000000 | 00000003 | 00000002 | 00000001 | Standby |
| 00000000 | 00000004 | 00000002 | 00000002 | Standby |
| ...... | | | | |

FIG. 6

STORAGE MANAGEMENT TABLE  1006

| DKCID | IP ADDRESS | USER NAME | PASSWORD | DKC CPU UTILIZATION |
|---|---|---|---|---|
| 00000000 | 192.168.0.1 | Administrator | * * * * * | 30% |
| 00000001 | 192.168.0.2 | Administrator | * * * | 70% |
| 00000002 | 192.168.0.3 | Administrator | * * * * * | 55% |
| ...... | | | | |
| | | | | |

FIG. 7

LOGICAL PATH TABLE  1013

| PATH ID | HBA WWN | DKCID | PORT NAME | LUN | GUID | PATH STATUS |
|---|---|---|---|---|---|---|
| 00000000 | 00:00:00:00:00:00:00:00 | 00000000 | 0A | 0 | 00000000 | Active |
| 00000001 | 00:00:00:00:00:00:00:00 | 00000000 | 0A | 1 | 00000001 | Active |
| 00000002 | 11:11:11:11:11:11:11:11 | 00000001 | 1A | 0 | 00000002 | Active |
| 00000003 | 11:11:11:11:11:11:11:11 | 00000001 | 1A | 1 | 00000002 | Standby |
| 00000004 | 11:11:11:11:11:11:11:11 | 00000001 | 1A | 2 | 00000002 | Standby |
| ...... | | | | | | |

PATH SETTING TABLE  1026

| PORT NAME | LUN | HBA WWN | GUID | LDEV NUMBER |
|---|---|---|---|---|
| 0A | 0 | 22:33:44:55:66:77:88:99 | 00000000 | 00000000 |
| 0A | 1 | 22:22:22:22:33:33:33:33 | 00000001 | 00000000 |
| ...... | | | | |
| | | | | |

LDEV TABLE  1027

| LDEV NUMBER | WWN OF FC PORT OF INTERMEDIATE DKC TO BE CONNECTED TO EXTERNAL DKC | WWN OF FC PORT OF EXTERNAL DKC TO BE CONNECTED TO INTERMEDIATE | LUN OF EXTERNAL DKC | GUID |
|---|---|---|---|---|
| 00000000 | — | — | — | 00000000 |
| 00000001 | 00:11:22:33:44:55:66:77 | 11:22:33:44:55:66:77:88 | 0 | 00000001 |
| ...... | | | | |
| | | | | |

STORAGE SYSTEM AND LOAD BALANCING METHOD THEREOF

CROSS-REFERENCES TO RELATED APPLICATIONS

This application relates to and claims priority from Japanese Patent Application No. 2005-342643, filed on Nov. 18, 2005, the entire disclosure of which is incorporated herein by reference.

BACKGROUND

The present invention relates to storage subsystems (storage controller) with a function of virtualizing a common storage volume from them, and to a load balancing method thereof.

In a database system handling large amount of data in a data center or the like, data is stored in a storage subsystem such as a disk array system. A disk array system has a plurality of storage devices disposed in an array, and provides its storage volumes configured in RAID (Redundant Arrays of Independent Inexpensive Disks) to a host system. The host system and the storage subsystem are mutually connected via a device sharing network such as a SAN (Storage Area Network). Regarding a functionality of such a storage subsystem, Japanese Patent Laid-Open Publication No. 2005-165444 proposes a method of virtualizing a storage volume in an external storage subsystem as its storage volume and making it assignable to a host computer. Further, Japanese Patent Laid-Open Publication No. 2003-316522 proposes a method of absorbing the difference in functions or specification of a plurality of storage subsystems, and comprehensively utilizing the functions of the plurality of storage subsystems.

SUMMARY

If the virtualization technology of external volumes is utilized, by virtualizing an external volume from a storage subsystems, the host computer will be able to perform its I/O processing to the external volume via the virtual volume.

However, conventionally, when a common external volume is virtualized from a plurality of storage subsystems, a host computer does not recognize that the storage subsystems have virtualized the same external volume. Therefore, even if the work load of a logical path to the external volume through one of the storage subsystems became heavy, or even if a failure occurred in the logical path, the host computer is not able to switch an access path to another logical path.

Thus, the object of the present invention is to overcome the foregoing problem, and to seek the load balancing among storage subsystems having a function of virtualizing a common external volume from them.

In order to achieve the foregoing object, with the present invention, a host computer recognizes that virtual volumes assigned from more than one storage subsystems are actually a virtualized volume of a common external volume; and a plurality of logical paths, which connect each of the plurality of virtual volumes formed by virtualizing the common external volume and a host system, are set as an alternate path of another logical path.

As the means for a virtual volume of each of a plurality of storage subsystems to recognize that it is a virtualization of a common external volume, it is desirable to use a GUID (Globally Unique Identifier). A GUID is assigned as unique identifying information of the respective storage volumes in the storage subsystem. Specifically, a unique GUID is assigned to a storage volume having an actual storage resource. Meanwhile, a GUID of a virtualized source external volume is assigned to the virtual volume formed by virtualizing the external volume having an actual storage resource. If the GUIDs of the virtual volumes of each of the plurality of storage subsystems coincide, the host computer will be able to recognize that such virtual volumes are virtualizations of a common external volume.

By controlling the path switching among a plurality of logical paths that are respectively connected to a plurality of virtual volumes formed by virtualizing a common external volume, and a host computer, load balancing enabling the work load of the respective storage subsystems to be balanced can be realized.

According to the present invention, load balancing among storage subsystems having a function of virtualizing a common external volume can be realized.

DESCRIPTION OF DRAWINGS

FIG. 1 is a system configuration of the computer system according to the present embodiment;

FIG. 4 is an explanatory diagram of the host management table according to the present embodiment;

FIG. 5 is an explanatory diagram of the logical path management table according to the present embodiment;

FIG. 6 is an explanatory diagram of the storage management table according to the present embodiment;

FIG. 7 is an explanatory diagram of the logical path table according to the present embodiment;

DETAILED DESCRIPTION

Figure 2B:
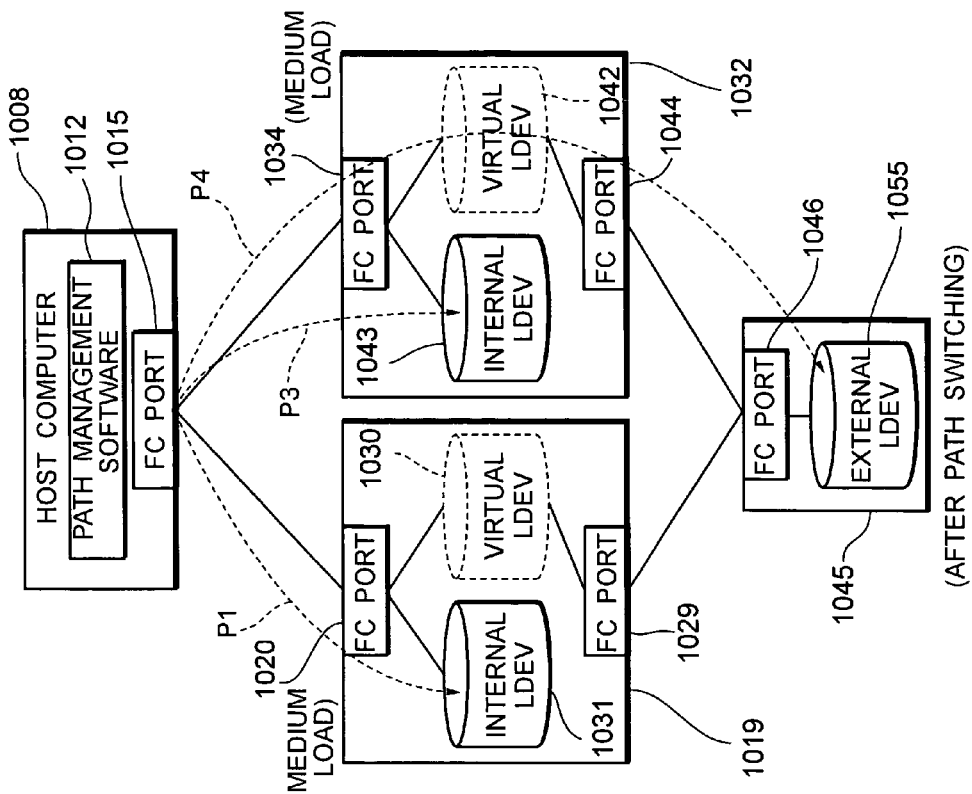
FIG. 2A-2B are explanatory diagrams showing the outline of the load balancing method according to the present embodiment.

Outline of the load balancing method of a computer system 100 according to the present embodiment is now explained with reference to FIG. 1 and FIG. 2.

FIG. 1 shows the system configuration of a computer system 100 according to the present embodiment. The computer system 100 has a host computer 1008, a first storage subsystem 1019, a second storage subsystem 1032, an external storage subsystem 1045 and a management server 1000.

The first storage subsystem 1019 has an internal LDEV (internal storage volume) 1031, a virtual LDEV (virtual storage volume) 1030, FC (Fibre Channel) ports 1020, 1029, and a service processor (SVP) 1022.

The internal LDEV 1031 is an actual storage volume (actual logical device) that is defined on a physical storage device (a disk drive for example) provided inside the first storage subsystem 1019. The virtual LDEV 1030 is a virtual existence that does not have an actual storage resource, and the substance that stores data exists in the external LDEV (external storage volume) 1055 of the external storage subsystem 1045. In other words, the virtual LDEV 1030 is configured by an external LDEV 1055 of the external storage subsystem 1045 being mapped to the storage resource of the first storage subsystem 1019. Here, mapping refers to the association of the address spaces of the respective storage volumes (logical devices). The storage volumes to be associated may be actual storage volumes or virtual storage volumes. Details regarding the virtualization method for mapping the external LDEV 1055 to the virtual LDEV 1030 are disclosed in Japanese Patent Laid-Open Publication No. 2005-107645. The first storage subsystem 1019 incorporates the external LDEV 1055 as its own internal storage volume, and provides this as an LU (Logical Unit) to the host computer 1008.

The second storage subsystem 1032 has an internal LDEV (internal storage volume) 1043, a virtual LDEV (virtual storage volume) 1042, FC ports 1034, 1044, and a service processor (SVP) 1033.

The virtual LDEV 1042 is a virtual existence that does not have an actual storage resource, and the substance that stores data exists in the external LDEV 1055 of the external storage subsystem 1045. In other words, the virtual LDEV 1042 is configured by the external LDEV 1055 of the external storage subsystem 1045 being mapped to the storage resource of the second storage subsystem 1032. The second storage subsystem 1032 incorporates the external LDEV 1055 as its own internal storage volume, and provides this as an LU (Logical Unit) to the host computer 1008.

Like this, in the present embodiment, the plurality of storage subsystems 1019, 1032 virtualize the common external LDEV 1055, and provide virtual LDEVs 1030, 1042 to the host computer 1008.

The external storage subsystem 1045 has an external LDEV 1055 and an FC port 1046.

The external LDEV 1055 is an actual storage volume formed on a physical storage device (a disk drive for example) provided inside the external storage subsystem 1045. Since the external LDEV 1055 exists outside when viewed from the first storage subsystem 1019 or second storage subsystem 1032, this is referred to as an external volume as a matter of convenience in the specification. Nevertheless, from the perspective that the [external LDEV 1055] exists inside the external storage subsystem 1045, this is also an internal LDEV Further, although the external storage subsystem 1045 is referred to as an external storage subsystem as a matter of convenience in the specification since it has an external LDEV 1055, this may also be referred to as a third storage subsystem. Further, the first and second storage subsystems may be separately referred to as intermediate storage subsystems. Further, the storage subsystem may be separately referred to as a DKC.

The host computer 1008 has path management software 1012, a LAN port 1014, and an FC port 1015.

The management server 1000 has management software 1003, and a LAN port 1007.

The LAN ports 1007, 1014 and service processors 1022, 1033 are mutually connected via a LAN 1056. An FC port 1015 is connected to an FC port 1020 and an FC port 1034 via a fibre channel 1057. An FC port 1046 is connected to an FC port 1029 and an FC port 1044 via the fibre channel 1057.

A GUID (Globally Unique Identifier) is assigned to the respective storage volumes in the computer system 100 as unique identifying information of the overall system. A unique GUID is assigned to the internal LDEVs 1031, 1043 and external LDEV 1055 having an actual storage resource. Meanwhile, a GUID of a virtualization source storage volume; that is, the GUID of the external LDEV 1055 is assigned to the virtual LDEVs 1030, 1042 that do not have an actual storage resource. In the present embodiment, since the virtual LDEVs 1030, 1042 are both virtualized storage volumes of the external LDEV 1055, these will have the same GUID.

The path management software 1012 will recognize the virtual LDEVs 1030, 1042 to be the virtualizations of the same storage volume since they have the same GUID, and sets one logical path of either the logical path to be connected from the host computer 1008 to the external LDEV 1055 via the virtual LDEV 1030 or the logical path to be connected from a host computer 1008 to the external LDEV 1055 via the virtual LDEV 1042 as an alternate path of the other logical path.

The management software 1003 manages the configuration information of the alternate path to be connected from the host computer 1008 to the external LDEV 1055, and monitors the respective work loads of the first storage subsystem 1019 and second storage subsystem 1032. And, when the management software 1003 detects that the work load of either the first storage subsystem 1019 or second storage subsystem 1032 exceeded a predetermined threshold, management software 1003 instructs the path management software 1012 to perform path switching. Then, the path management software 1012 executes path switching.

Resource utilization (for instance, cache memory utilization, IOPS (number of I/O processing routines of the storage subsystem per unit time), transmission rate (data transmission volume flowing through the logical path per unit time), response time (time required by the storage subsystem to respond upon receiving an I/O request from the host system), I/O processing time (time required for the storage subsystem to perform I/O processing) and so on) may be used as the work load of the storage subsystem.

Here, path switching is explained with reference to FIG. 2A and FIG. 2B. A case is considered where a plurality of logical paths P1, P2, P3, P4 are defined as paths for accessing the respective storage volumes 1031, 1043, 1055 from the host computer 1008. The logical path P1 is a path for the host computer 1008 to access the internal LDEV 1031. The logical path P2 is a path for the host computer 1008 to access the external LDEV 1055 via the virtual LDEV 1030. The logical path P3 is a path for the host computer 1008 to access the internal LDEV 1043. The logical path P4 is a path for the host computer 1008 to access the external LDEV 1055 via the virtual LDEV 1042.

Figure 2A:
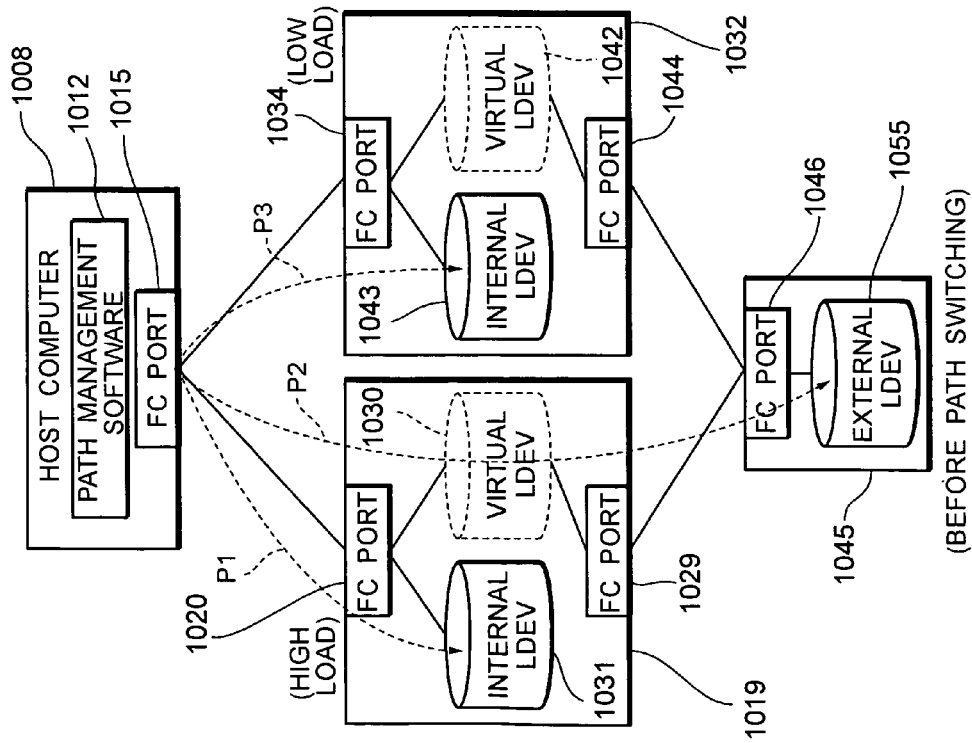

As shown in FIG. 2A, the host computer 1008 uses the logical paths P1, P2, P3 to access the internal LDEV 1031, external LDEV 1055 and internal LDEV 1043. Let it be assumed that the first storage subsystem 1019 is in a state of high work load, and the second storage subsystem 1032 is in a state of low work load. Then, as shown in FIG. 2B, the path management software 1012 switches the path for accessing the external LDEV 1055 from the logical path P2 to the logical path P4. Thereby, the work load of the first storage subsystem 1019 and the work load of the second storage subsystem 1032 can be balanced. Incidentally, path switching, in the case of the foregoing example, is to switch the logical path P2 from "Active" to "Standby" on the one hand, and to switch the logical path P4 from "Standby" to "Active" on the other hand.

Embodiments

Embodiments of the present invention are now explained with reference to FIG. 3 to FIG. 19.

Figure 3:
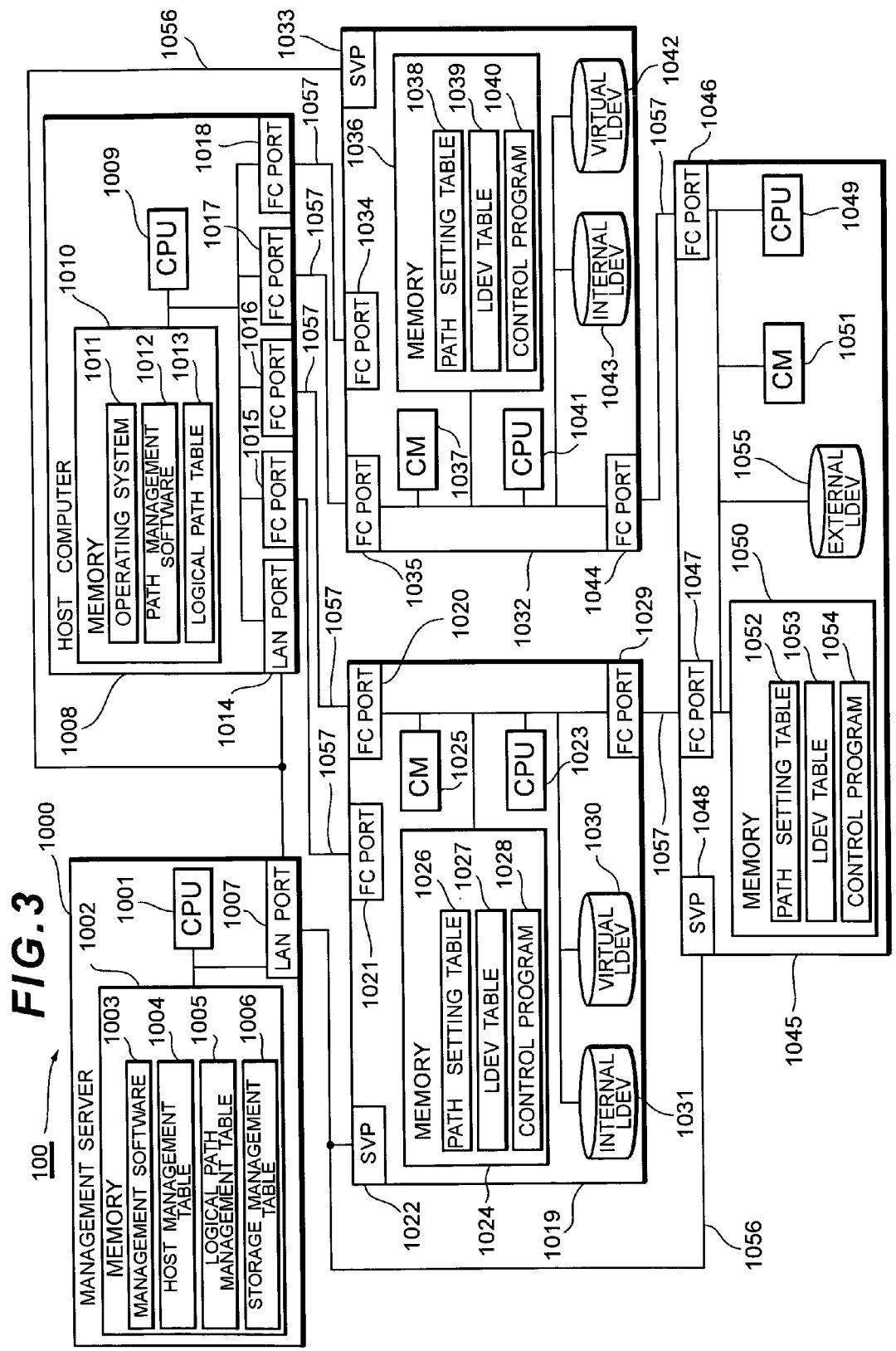
FIG. 3 is a system configuration of the computer system according to the present embodiment.

FIG. 3 shows the system configuration of the computer system 100 according to the present embodiment. Components having the same reference numeral as the components shown in FIG. 1 represent the same components, and the detailed explanation thereof is omitted.

The host computer 1008 has a CPU 1009, a memory 1010, a LAN port 1014 and FC ports 1015 to 1018. The CPU 1009 controls the access to the first storage subsystem 1019, second storage subsystem 1032 and external storage subsystem 1045, and the switching of the logical path. The memory 1010 stores an operating system 1011, path management software 1012 and a logical path table 1013. Details regarding the path management software 1012 and logical path table 1013 will be explained later. The host computer 1008, for example, is a workstation, mainframe, personal computer or the like, and, specifically, is an ATM system of banks or a seat reservation system of airline companies.

The first storage subsystem 1019 has a CPU 1023, a memory 1024, a cache memory (CM) 1025, an internal LDEV 1031, a virtual LDEV 1030, FC ports 1020, 1021, 1029, and a service processor 1022. The CPU 1023 controls the system of the first storage subsystem 1019. The memory 1024 stores a path setting table 1026, a LDEV table 1027 and a control program 1028. The cache memory 1025 temporarily stores data to be read from or written into the internal LDEV 1031 or virtual LDEV 1030. Details regarding the path setting table 1026 and LDEV table 1027 will be described later.

The second storage subsystem 1032 has a CPU 1041, a memory 1036, a cache memory (CM) 1037, an internal LDEV 1043, a virtual LDEV 1042, FC ports 1034, 1035, 1044, and a service processor 1033. The CPU 1041 controls the system of the second storage subsystem 1032. The memory 1036 stores a path setting table 1038, a LDEV table 1039 and a control program 1040. The cache memory 1037 temporarily stores data to be read from or written into the internal LDEV 1043 or virtual LDEV 1042. Details regarding the path setting table 1038 and LDEV table 1039 will be described later.

The external storage subsystem 1045 has a CPU 1049, a memory 1050, a cache memory (CM) 1051, an external LDEV 1055, FC ports 1046, 1047, and a service processor 1048. The CPU 1049 controls the system of the external storage subsystem 1045. The memory 1050 stores a path setting table 1052, a LDEV table 1053 and a control program 1054. The cache memory 1051 temporarily stores data to be read from or written into the external LDEV 1055. Details regarding the path setting table 1052 and LDEV table 1053 will be described later.

The management server 1000 has a CPU 1001, a memory 1002 and a LAN port 1007. The CPU 1001 manages the various logical resources and physical resources of the overall computer system 100. The memory 1002 stores management software 1003, a host management table 1004, a logical path management table 1005 and a storage management table 1006. Details regarding the host management table 1004, logical path management table 1005 and storage management table 1006 will be described later.

Incidentally, the LAN port 1014 of the host computer 1008, service processor 1022 of the first storage subsystem 1019, service processor 1033 of the second storage subsystem 1032, service processor 1048 of the external storage subsystem 1045 and LAN port 1007 of the management server 1000 are mutually connected via the LAN 1056. Further, the FC ports 1015, 1016 or the host computer 1008 are respectively connected to the FC ports 1021, 1020 of the first storage subsystem 1019 via the fibre channel 1057, and the FC ports 1017, 1018 of the host computer 1008 are respectively connected to the FC ports 1035, 1034 of the second storage subsystem 1032 via the fibre channel 1057. Moreover, the FC port 1029 of the first storage subsystem 1019 is connected to the FC port 1047 of the external storage subsystem 1045 via the fibre channel 1057, and the FC port 1044 of the second storage subsystem 1032 is connected to the FC port 1046 of the external storage subsystem 1045 via the fibre channel 1057.

In the present embodiment, for simplifying the explanation, only one host computer 1008, one first storage subsystem 1019, one second storage subsystem 1032 and one external storage subsystem 1045 are used. Nevertheless, a plurality of such components may also be used.

FIG. 4 shows a table schema of the host management table 1004. The host management table 1004 is used for retaining various types of information of the host computer 1008, and is managed with the management software 1003. The management software 1003 uses the information stored in the host management table 1004 to access the host computer 1008, and acquires various types of information relating to the logical path. The host management table 1004 has one entry per host computer.

A "host ID" is identifying information for uniquely identifying the host computer in the computer system 100. The host ID is automatically created with the management software 1003. A "host name" is decided by the system administrator. An "IP address" is an IP (Internet Protocol) address of the host system. A "user name" is the user name of the system administrator. A "password" is a password of the system administrator.

FIG. 5 shows the table schema of the logical path management table 1005. The logical path management table 1005 is a table for retaining various types of information relating to the logical path, and is managed with the management software 1003. The management software 1003 acquires various types of information relating to the logical path from the path management software 1012 of the host computer 1008, and stores the acquired information in the logical path management table 1005. The logical path management table 1005 has one entry per logical path.

A "host ID" is identifying information for uniquely identifying the host computer in the computer system 100. A "host ID" is automatically created with the management software 1003. A "path ID" is identifying information for uniquely identifying the logical path in host computer units. In other words, a "path ID" is identifying information of a logical path to be connected to a host computer specified with the "host ID". By combining the "host ID" and "path ID", a logical path in the computer system 100 can be uniquely identified. A "GUID" is identifying information for uniquely identifying a storage volume in the computer system 100. In other words, a "GUID" is identifying information relating to a storage volume to be connected to a logical path uniquely specified based on the combination of the "host ID" and "path ID". A "DKC ID" is identifying information for uniquely identifying a storage subsystem in the computer system 100. In other words, a "DKC ID" is identifying information of a storage subsystem having a storage volume to be connected to a logical path uniquely specified based on the combination of the "host ID" and "path ID". A "path status" shows the three types of logical path statuses; namely, "Active", "Standby" and "Failed". "Active" shows that the logical path is in an operating state. "Standby" shows that the logical path is in a standby state. "Failed" shows that the logical path cannot be used due to a failure.

FIG. 6 shows the table schema of the storage management table 1006. The storage management table 1006 is a table for retaining various types of information relating to the storage subsystem, and is managed with the management software 100. The management software 1003 uses information stored in the storage management table 1006 to access the storage subsystem, acquires the CPU utilization, and stores this information in the storage management table 1006. The storage management table 1006 has one entry per storage subsystem.

A "DKC ID" is identifying information for uniquely identifying a storage subsystem in the computer system 100. An "IP address" is an IP address of a service processor of a storage subsystem specified with the "DKC ID". A "user name" is the user name of the system administrator. A "password" is the password of the system administrator. "DKC CPU utilization" is the average processor utilization rate of the storage subsystem specified with the "DKC ID".

FIG. 7 shows the table schema of the logical path table 1013. The logical path table 1013 is a table for retaining various types of information relating to the logical path, and is managed with the path management software 1012. The path management software 1012 scans the FC ports of the respective storage subsystems in order to acquire the GUID of the logical device connected to the respective FC ports, recognized the plurality of storage volumes having the same GUID to be "virtual LDEVs formed by virtualizing a common external volume", and defines a certain logical path among the plurality of logical paths to be connected to such virtual LDEVs as an alternate path of another logical path. The logical path table 1013 has one entry per logical path.

A "path ID" is identifying information for uniquely identifying a logical path in host computer units. An "HBA WWN" is the World Wide Name of the FC port of a host computer to which a logical path specified with the "path ID" is connected. The FC port of the host computer is referred to as a Host Bus Adapter (HBA). A "DKC ID" is identifying information for uniquely identifying a storage subsystem in the computer system 100. In other words, a "DKC ID" is identifying information of a storage subsystem to which a logical path specified with the "path ID" is connected. A "port name" is the name of the FC port of a storage subsystem specified with the "DKC ID". A "port name" is unique identifying information in storage subsystem units. A "LUN" is a Logical Unit Number of a storage volume assigned to the FC port to be connected to a logical path specified with the path ID. A "LUN" is a unique numerical value in port units. A "GUID" is identifying information for uniquely identifying a storage volume in the computer system 100. In other words, a GUID is identifying information of a storage volume to be connected to a logical path uniquely specified based on the combination of "path ID", "HBA WWN", "DKC ID", "port name" and "LUN". A "path status" shows the three types of logical path statuses; namely, "Active", "Standby" and "Failed". "Active" shows that the logical path is in an operating state.

Figure 8:
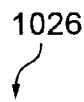
FIG. 8 is an explanatory diagram of the path setting table according to the present embodiment.

FIG. 8 shows the table schema of the path setting table 1026. The path setting table 1026 retains various types of information relating to the storage volume assigned to the respective FC ports of the storage subsystem. The path management software 1012 acquires various types of information (LDEV assignment information) stored in the path setting table 1026 by issuing an Inquiry command to the storage volume assigned to the FC port of the storage subsystem. Details regarding the Inquiry command are prescribed in a SCSI protocol. The path setting table 1026 has one entry per LDEV assignment setting.

A "port name" is the name of the FC port of the storage subsystem. A "port name" is unique identifying information in storage subsystem units. A "LUN" is a Logical Unit Number of the storage volume assigned to the FC port specified with the "port name". A "LUN" is a unique numerical value in port units. An "HBA WWN" is the World Wide Name of the FC port of a host computer to which a logical path specified with the "port name" and "LUN" is connected. A "GUID" is identifying information for uniquely identifying a storage volume in the computer system 100. In other words, a GUID is identifying information of a storage volume to be connected to a logical path uniquely specified based on the combination of "port name", "LUN" and "HBA WWN". A GUID is assigned to the internal LDEV by the control program when the control program creates a LDEV. The GUID of the external LDEV is assigned to the virtual LDEV. An "LDEV number" is identifying information of the storage volume uniquely specified based on the combination of "port name", "LUN", "HBA WWN" and "GUID". The "LDEV number" is unique identifying information in storage subsystem units.

Incidentally, the table schema of the path setting tables 1038, 1052 and the table schema of the path setting table 1026 are the same.

Figure 9:
FIG. 9 is an explanatory diagram of the LDEV table according to the present embodiment.

FIG. 9 shows the table schema of the LDEV table 1027. The LDEV table 1027 retains information on the internal LDEV and virtual LDEV recognized by the storage subsystem. The LDEV table 1027 has one entry per LDEV A "LDEV number" is identifying information of a storage volume (internal LDEV or virtual LDEV) of the storage subsystem, and is unique in storage subsystem units. "WWN of FC port of intermediate DKC to be connected to external DKC" is the World Wide Name of the FC port of the intermediate storage subsystem to be connected to the external storage subsystem. "WWN of FC port of external DKC to be connected to intermediate DKC" is the World Wide Name of the FC port of the external storage subsystem to be connected to the intermediate storage subsystem. "LUN of external DKC" is the Logical Unit Number of the storage volume of the external storage subsystem. "LUN of external DKC" is a unique numerical value in port units. In other words, "LUN of external DKC" is uniquely specified based on the combination of the "WWN of FC port of intermediate DKC to be connected to external DKC" and "WWN of FC port of external DKC to be connected to intermediate DKC". A "GUID" is identifying information for uniquely identifying a storage volume in the computer system 100. In other words, a GUID is identifying information of a storage volume to be connected to a logical path uniquely specified based on the combination of "WWN of FC port of intermediate DKC to be connected to external DKC", "WWN of FC port of external DKC to be connected to intermediate DKC" and "LUN of external DKC".

Incidentally, the table schema of the LDEV tables 1039, 1053 and the table schema of the LDEV table 1027 are the same.

Figure 10:
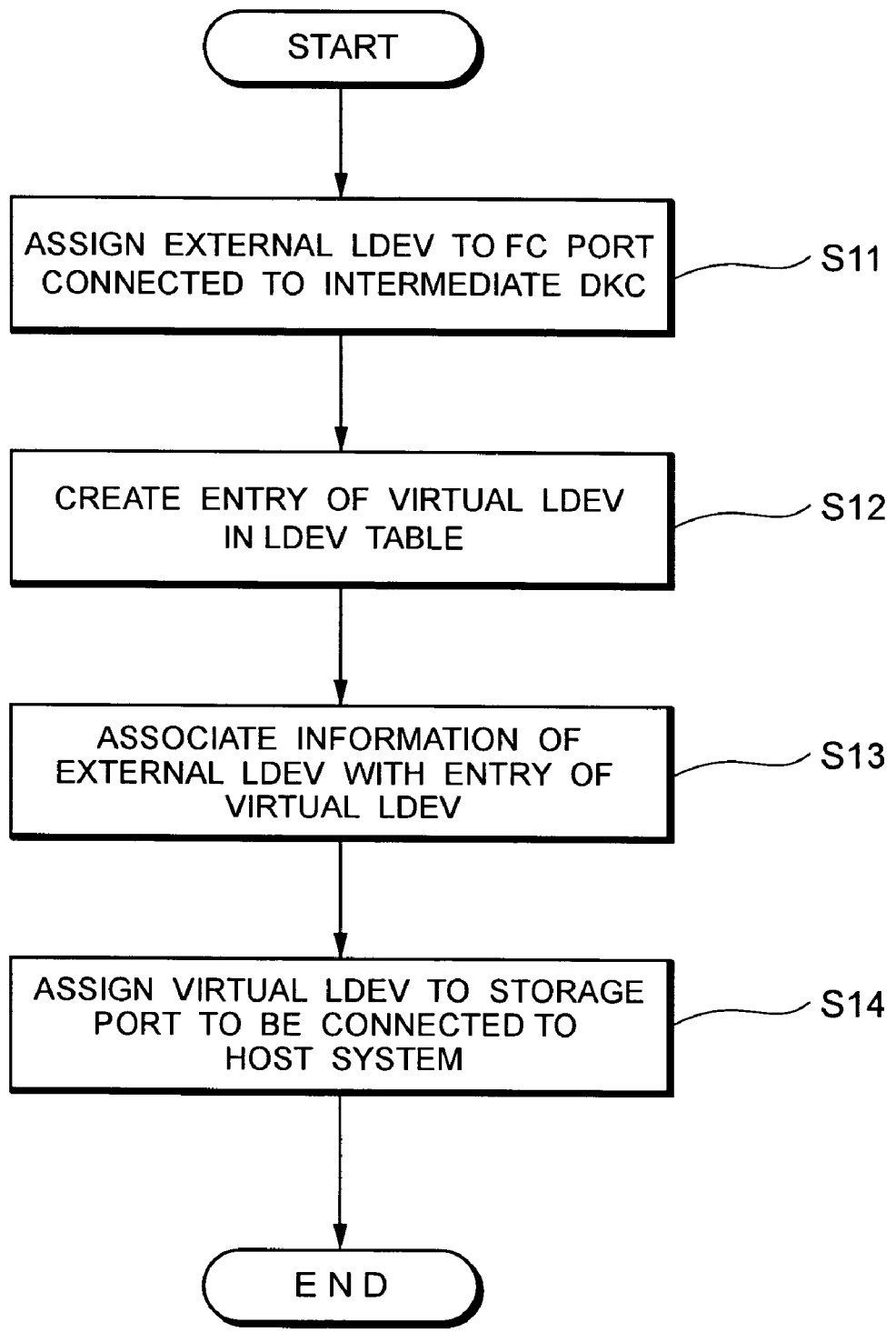
FIG. 10 is a flowchart showing the virtual LDEV creation process according to the present embodiment.

FIG. 10 is a flowchart describing the virtual LDEV creation process. In the virtual LDEV creation process, the system administrator assigns the virtual LDEVs 1030, 1042 formed by virtualizing the external LDEV 1055 in the first storage subsystem 1019 and second storage subsystem 1032, and the internal LDEVs 1031, 1043 having an actual storage resource to the FC ports 1020, 1021, 1034, 1035. Thereby, the host computer 1008 is able to recognize the virtual LDEVs 1030, 1042. The respective processing steps are described in detail below.

Foremost, the system administrator operates the service processor 1048 of the external storage subsystem 1045 and assigns the external LDEV 1055 to the FC port 1047 of the first storage subsystem 1019 and the FC port 1046 of the second storage subsystem 1032 (S11). Here, information (port name, LUN, HBA WWN, storage port WWN, GUID, DKC ID, information for differentiating an internal LDEV and virtual LDEV) for assigning the external LDEV 1055 to the FC ports 1047, 1046 is stored in the path setting table 1052 of the external storage subsystem 1045.

Next, the system administrator operates the service processor of the first storage subsystem 1019 and the service processor 1033 of the second storage subsystem 1032 and creates an entry of the virtual LDEVs 1030, 1042 in the LDEV tables 1027, 1039, and reserves the LDEV number of the virtual LDEVs 1030, 1042 in such entry (S12). Here, although both the LDEV number and GUID are assigned to the entry of the internal LDEVs 1031, 1043 stored in the LDEV tables 1027, 1039, only the LDEV number, and not the GUID, is assigned to the entry of the virtual LDEVs 1030, 1042.

Next, the system administrator operates the service processor 1022 of the first storage subsystem 1019 and the service processor 1033 of the second storage subsystem 1032 to scan the FC ports 1029, 1044 connected to the external storage subsystem 1045, recognizes the external LDEV 1055, and associates the information of the external LDEV 1055 to the entry reserved for the virtual LDEVs 1030, 1042 (S13). Here, the LDEV number, WWN of the FC port of the intermediate DKC to be connected to the external DKC, WWN of the FC port of the external DKC to be connected to the intermediate DKC, LUN of the external DKC and GUID are assigned to the entry of the virtual LDEVs 1030, 1042 stored in the LDEV tables 1027, 1039.

Next, the system administrator operates the service processor 1022 of the first storage subsystem 1019 and the service processor 1033 of the second storage subsystem 1032 to assign the virtual LDEVs 1030, 1042 formed by virtualizing the external LDEV 1055 to the FC ports 1020, 1021, 1034, 1035 to be connected to the host computer 1008 (S14). Here, information (GUID, information for differentiating the internal LDEV and virtual LDEV, storage port name of the intermediate DKC, WWN of the storage port of the intermediate DKC, port name of the external DKC, WWN of the storage port of the external DKC, LUN) for assigning the virtual LDEVs 1030, 1042 to the FC ports 1020, 1021, 1034, 1035 is stored in the path setting table 1026 of the first storage subsystem 1019 and the path setting table 1038 of the second storage subsystem 1032.

Figure 11:
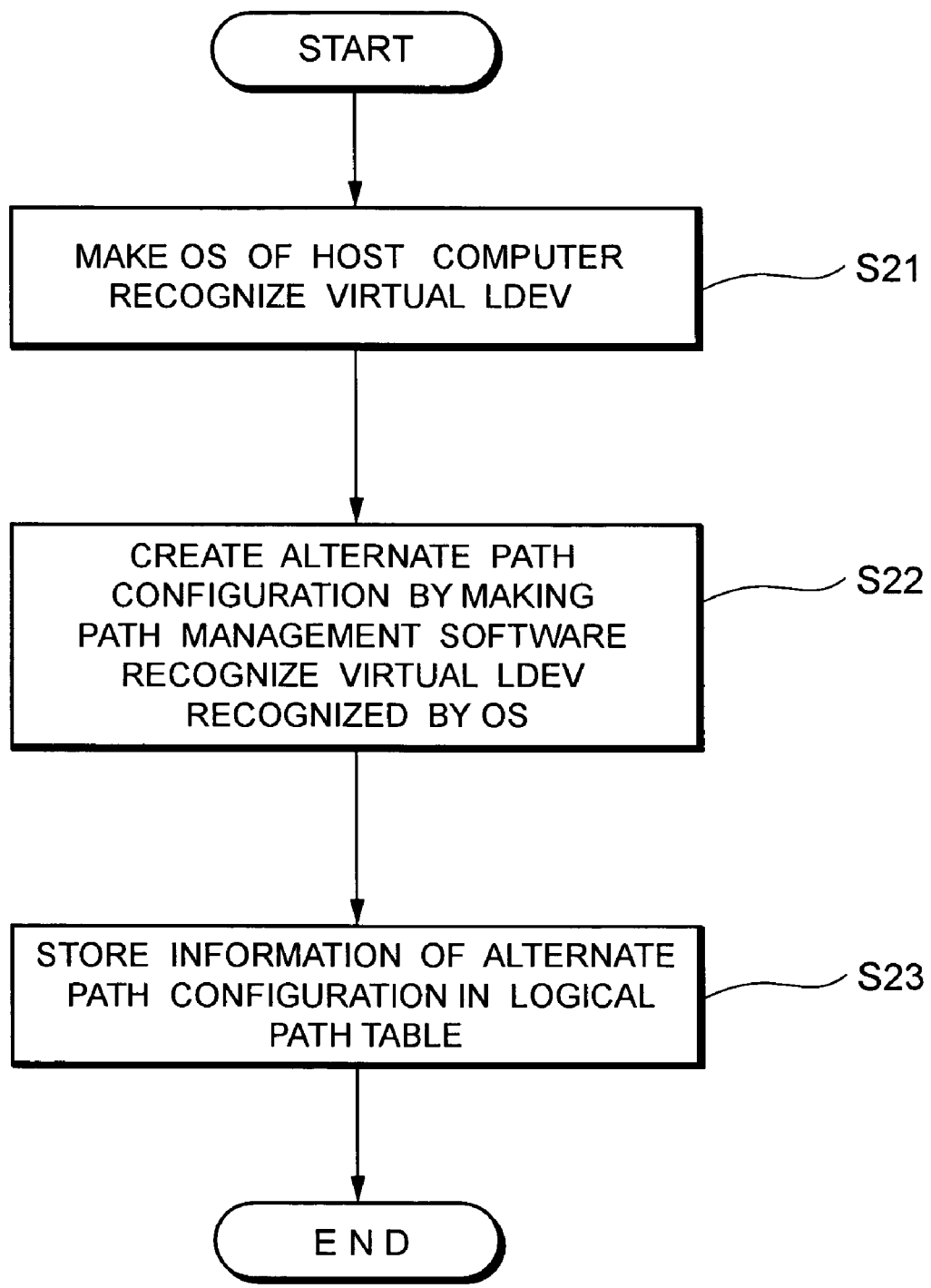
FIG. 11 is a flowchart showing the alternate path configuration process according to the present embodiment.

FIG. 11 is a flowchart describing the alternate path configuration process. In the alternate path configuration process, the system administrator uses the path management software 1012 of the host computer 1008 to configure an alternate path to the virtual LDEVs 1030, 1042. The respective processing steps are now explained in detail below.

Foremost, the system administrator operates the operating system 1011 of the host computer 1008 to scan the FC ports 1015, 1016, 1017, 1018 connected to the first storage subsystem 1019 and second storage subsystem 1032, and recognize the virtual LDEVs 1030, 1042 (S21). Here, information on the virtual LDEVs 1030, 1042 to be recognized by the operating system 1011 is the port name, LUN, HBA WWN, and GUID.

Next, the system administrator makes the path management software 1012 recognize the virtual LDEVs 1030, 1042 recognized by the operating system 1011, and creates an alternate path configuration (S22).

Next, the system administrator stores the information (path ID, GUID, information for differentiating the internal LDEV and virtual LDEV, DKC ID, path status) of the alternate path configuration created by the path management software 1012 in the logical path table 1013.

Figure 12:
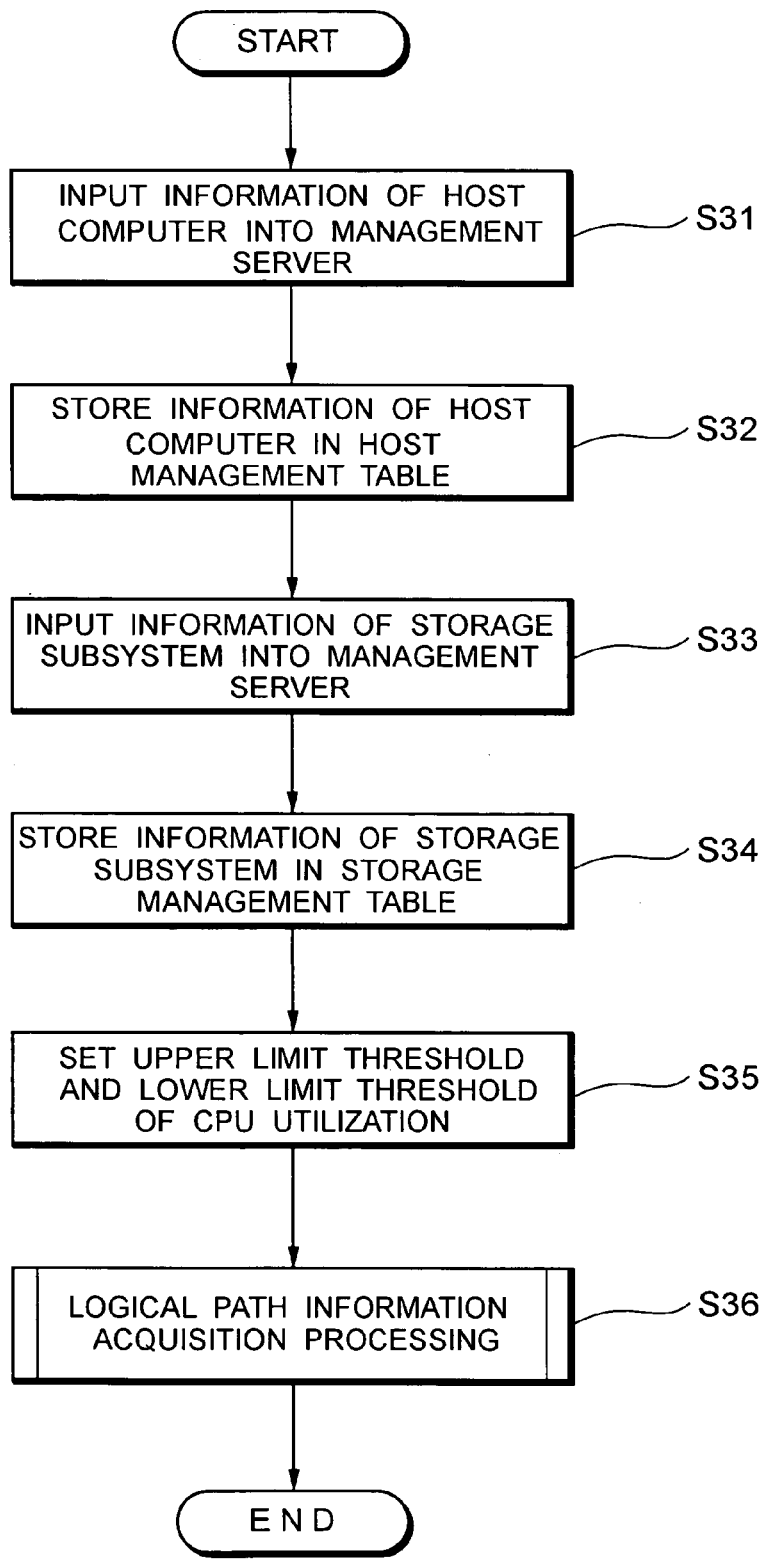
FIG. 12 is a flowchart showing the initialization process of management software according to the present embodiment.

FIG. 12 is a flowchart describing the initialization process of management software. In the initialization process of management software, the system administrator inputs information on the host computer 1008 and storage subsystems 1019, 1032, 1045 in the management software 1003. The management software 1003 acquires information relating to the logical path and information concerning the resource utilization of the storage subsystems 1019, 1032, 1045 based on the input information. The respective processing steps are now explained in detail below.

Foremost, the system administrator uses the management software 1003 to input information (host ID, host name, IP address, user name, password) relating to the host computer 1008 in the management server 1000 (S31).

Next, the management software 1003 stores information relating to the host computer 1008 in the host management table 1004 (S32).

Next, the system administrator uses the management software 1003 to input information (SVP ID, IP address, user name, password) relating to the first storage subsystem 1019 and second storage subsystem 1032 in the management server 1000 (S33).

Next, the management software 1003 stores information relating to the first storage subsystem 1019 and second storage subsystem 1032 in the storage management table 1006 (S34).

Next, the system administrator uses the management software 1003 to set the upper limit threshold and lower limit threshold of CPU utilization of the CPU 1023 of the first storage subsystem 1019 and the CPU 1041 of the second storage subsystem 1032 (S35). The upper limit threshold and lower limit threshold of CPU utilization set here will become the criteria in judging the necessity and adequacy in executing path switching between the first storage subsystem 1019 and second storage subsystem 1032. For example, 60% is set as the upper limit threshold of CPU utilization and 40% is set as the lower limit threshold of CPU utilization.

Next, the management software 1003 accesses the path management software 1012 to acquire information relating to the logical path, and stores the acquired information in the logical path management table 1005 (S36). Details regarding the logical path information acquisition process will be described later.

Figure 13:
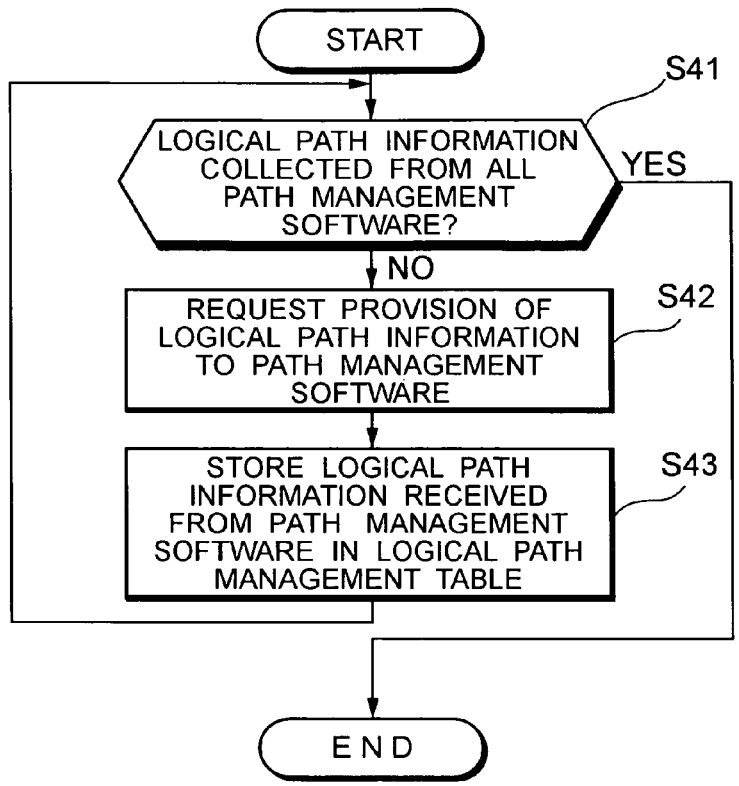
FIG. 13 is a flowchart showing the logical path information acquisition process according to the present embodiment.

FIG. 13 is a flowchart describing the logical path information acquisition process. As the opportunity to execute this logical path information acquisition process, for instance, there are cases (1) when the management software 1003 is to periodically monitor the logical path in order to constantly maintain the logical path management table 1005 in the latest state, (2) when the management software 1003 instructs the path management software 1012 to perform path switching, (3) when the path management software 1012 conducts path switching, and (4) when the management software 1008 collects information relating to the logical path after the network configuration of the computer system 100 is changed. The respective processing steps are now explained in detail below.

Foremost, the management software 1003 checks whether the logical path information was collected from all path management software 1012 (S41).

When the collection of logical path information from certain path management software 1012 is not complete (S41; NO), the management software 1003 request the path management software 1012 to provide logical path information (host ID, path ID, GUID, information for differentiating the internal LDEV and virtual LDEV, DKC ID, path status), and waits for a response (S42).

Next, the management software 1003 stores the logical path information received from the path management software 1012 in the logical path management table 1005 (S43).

Meanwhile, when the collection of logical path information from all path management software 1012 is complete (S41; YES), this processing routine is ended.

Figure 14:
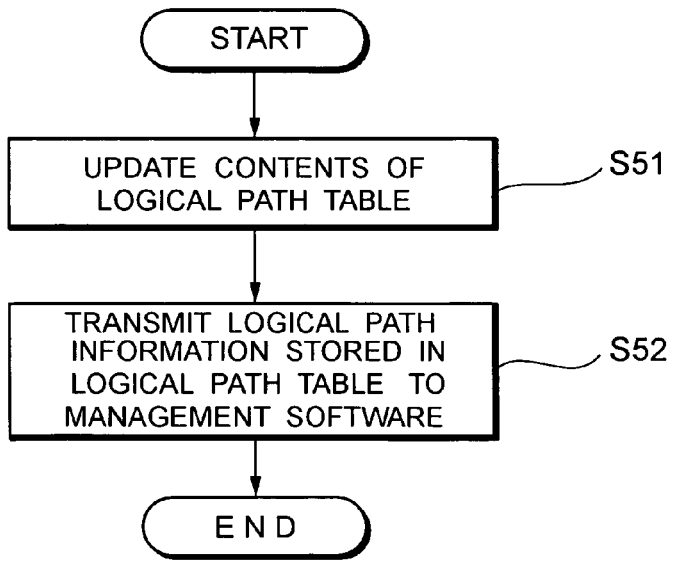
FIG. 14 is a flowchart showing the logical path information transmission process according to the present embodiment.

FIG. 14 is a flowchart describing the logical path information transmission process. The logical path information transmission process is executed when the path management software 1012 is requested by the management software 1003 to provide logical path information. The respective processing steps are now explained in detail below.

The path management software 1012 scans all FC ports 1015, 1016, 1017, 1018 of the host computer 1008, issues an Inquiry command to the storage volume assigned to the FC ports 1021, 1020, 1035, 1034 connected to the FC ports 1015, 1016, 1017, 1018, and acquires information (host ID, GUID, information for differentiating the internal LDEV and virtual LDEV, path ID, DKC ID, path status, LUN) of the logical path connected to the storage volume recognized by the operating system 1011 so as to update the contents of the logical path table 1013 (S51).

The path management software 1012 transmits all logical path information stored in the logical path table 1013 to the management software 1003 (S52).

Figure 15:
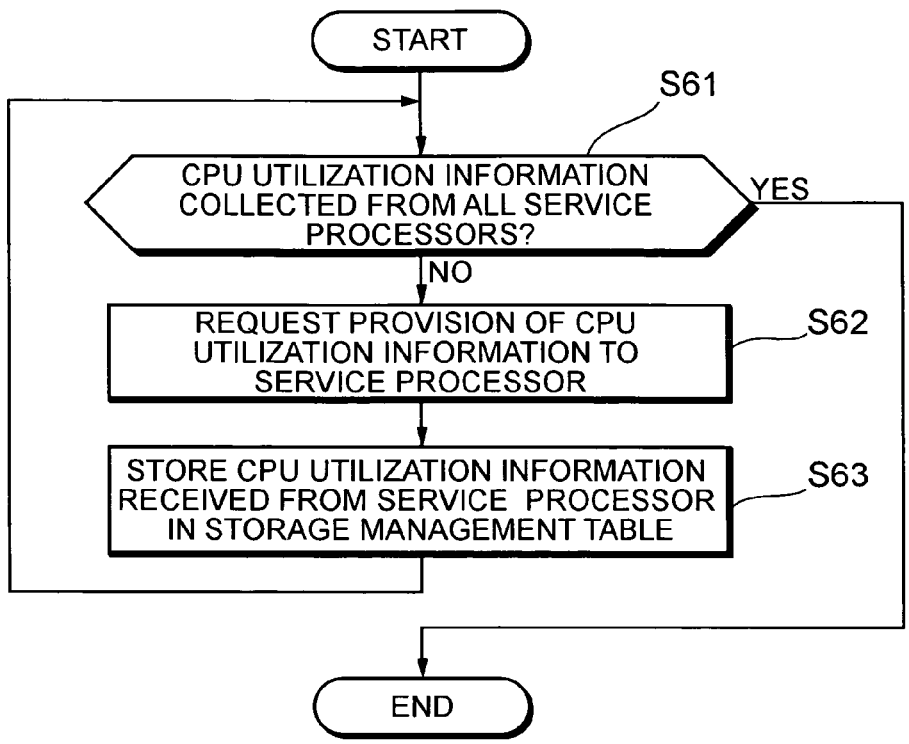
FIG. 15 is a flowchart showing the CPU utilization information acquisition process according to the present embodiment.

FIG. 15 is a flowchart describing the CPU utilization information acquisition process of the storage subsystem. As the opportunity to execute the CPU utilization information acquisition processing, for example, there are cases (1) when the management software 1003 periodically monitors the resource information of the first storage subsystem 1019 and second storage subsystem 1032 in order to constantly maintain the storage management table 1006 in the latest state, and (2) when the management software 1003 instructs the path management software 1012 to perform path switching. The respective processing steps are now explained in detail below.

Foremost, the management software 1003 checks whether information relating to CPU utilization has been collected from the service processors 1022, 1033 of all storage subsystems 1019, 1032 (S61).

When the collection of CPU utilization information from certain service processors is not complete (S61; NO), the management software 1003 requests the service processor to provide CPU utilization information, and waits for a response (S62).

The management software 1003 receives the CPU utilization information from the service processor, and stores this in the storage management table 1006 (S63).

Figure 16:
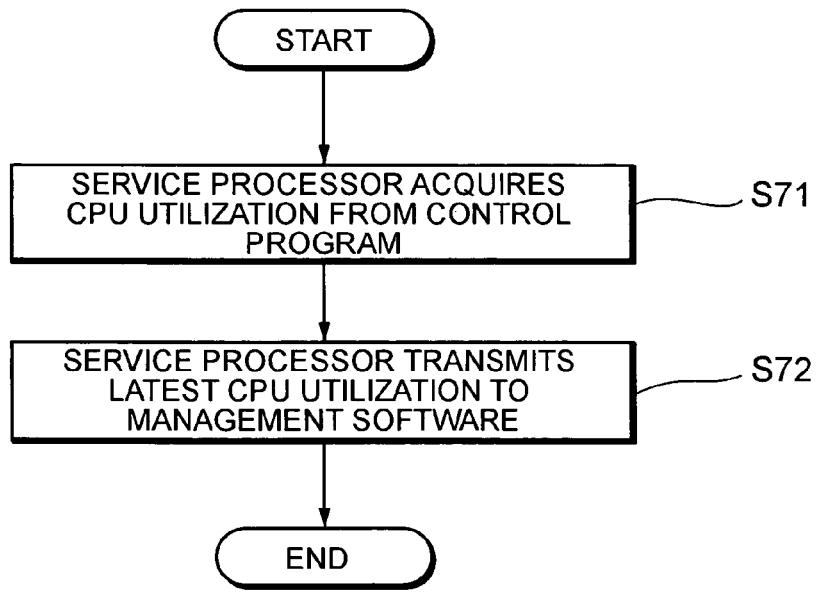
FIG. 16 is a flowchart showing the CPU utilization information transmission process of the storage subsystem according to the present embodiment.

FIG. 16 is a flowchart describing the CPU utilization information transmission process of the storage subsystem. The CPU utilization information transmission process is executed when the service processor is requested by the management software 1003 to provide CPU utilization information. The respective processing steps are now explained in detail below.

The service processor 1022 of the first storage subsystem 1019 and the service processor 1033 of the second storage subsystem 1032 respectively acquire the CPU utilization of the CPUs 1023, 1041 from the control programs 1028, 1040 (S71). Let it be assumed that the respective control programs 1028, 1040 are constantly monitoring the CPU utilization of the CPUs 1023, 1041 and retaining the latest CPU utilization.

Next, the service processors 1022, 1033 transmit the latest CPU utilization to the management software 1003 (S72).

Figure 17:
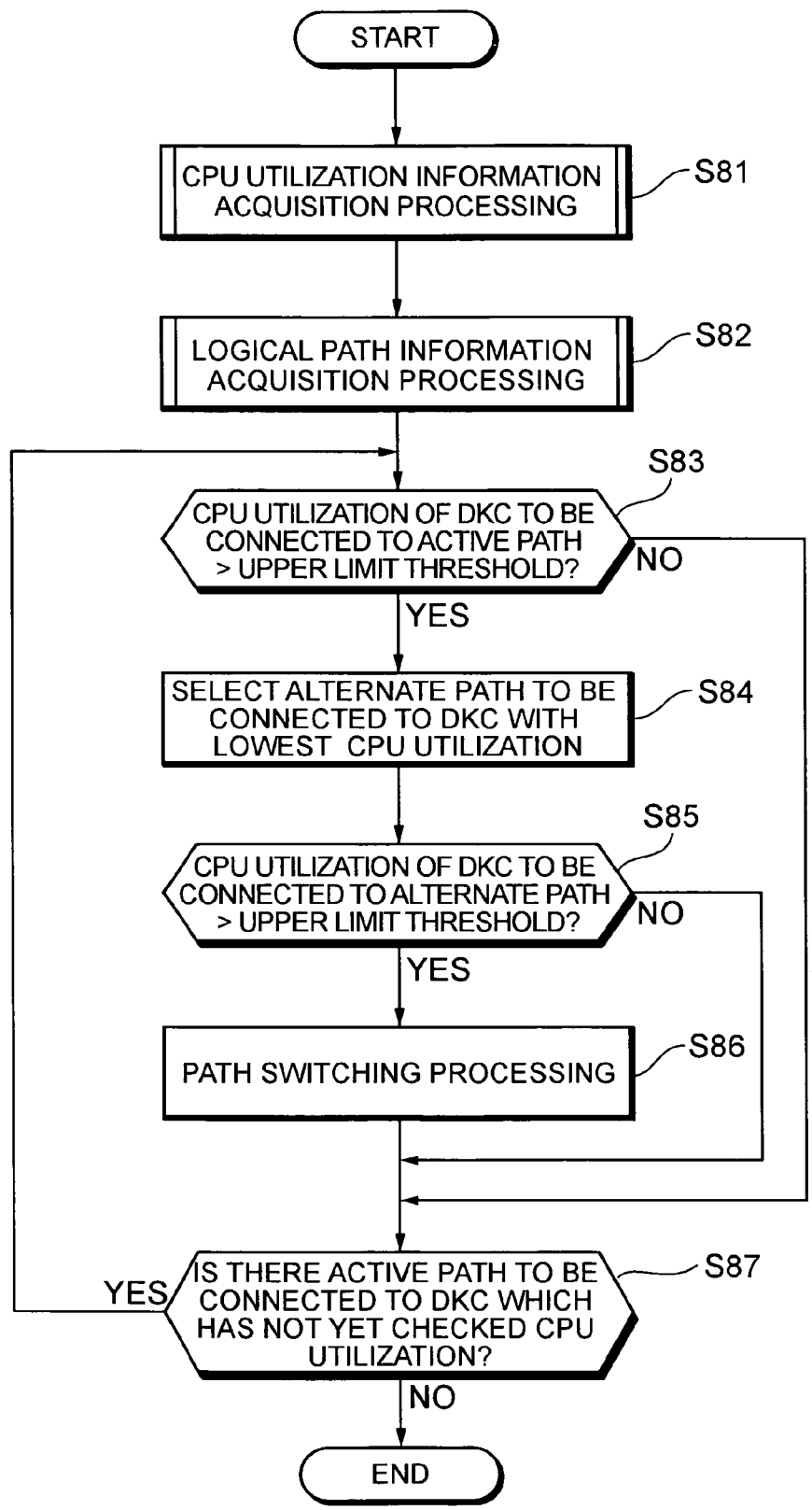
FIG. 17 is a flowchart showing the load balancing process of the storage subsystem according to the present embodiment.

FIG. 17 is a flowchart describing the load balancing processing of the storage subsystem. The management software 1003, for the purpose of checking the necessity of balancing the work load of the first storage subsystem 1019 and second storage subsystem 1032, periodically collects the work load of the first storage subsystem 1019 and second storage subsystem 1032. When the management software 1003 judges that load balancing is necessary during the processing of monitoring the work load of the first storage subsystem 1019 and second storage subsystem 1032, it instructs the path management software 1012 to perform path switching. The respective processing steps are now explained in detail below.

The management software 1003 collects the CPU utilization of the first storage subsystem 1019 and second storage subsystem 1032 (S81). Details regarding the CPU utilization acquisition process are as describe above (c.f. FIG. 16).

Next, the management software 1003 executes the logical path information acquisition process (S82). Details regarding the logical path information acquisition process are as described above (c.f. FIG. 13).

Next, the management software 1003 checks whether the CPU utilization of the storage subsystem connected to an Active path is exceeding the upper limit threshold (S83).

If the CPU utilization of the storage controller connected to an Active path is exceeding the upper limit threshold (S83; YES), the management software 1003 selects an alternate path to be connected to the storage controller with the lowest CPU utilization (S84).

And, when the CPU utilization of the storage subsystem connected to the selected alternate path is below the lower limit threshold (S85; YES), the management software 1003 executes path switching (S86). Details regarding the path switching process will be described in detail later.

When path switching is complete, the management software 1003 checks whether there is an Active path to be connected to the storage subsystem in which the CPU utilization has not yet been checked (S87). When this kind of Active path exists (S87; YES), the management software 1003 returns to the processing at S83.

Meanwhile, when the CPU utilization of the storage subsystem connected to the Active path is not exceeding the upper limit threshold (S83; NO), or when the CPU utilization of the storage subsystem to be connected to the selected alternate path is not below the lower limit threshold (S85; NO), the management software 1003 proceeds to the processing at S87.

Figure 18:
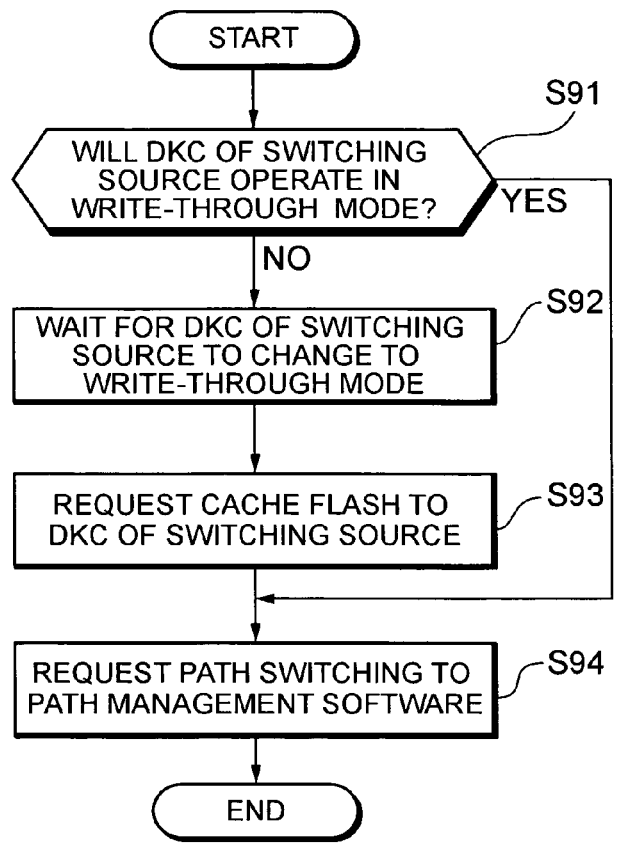
FIG. 18 is a flowchart showing the path switching process between the storage subsystems according to the present embodiment.
Figure 19:
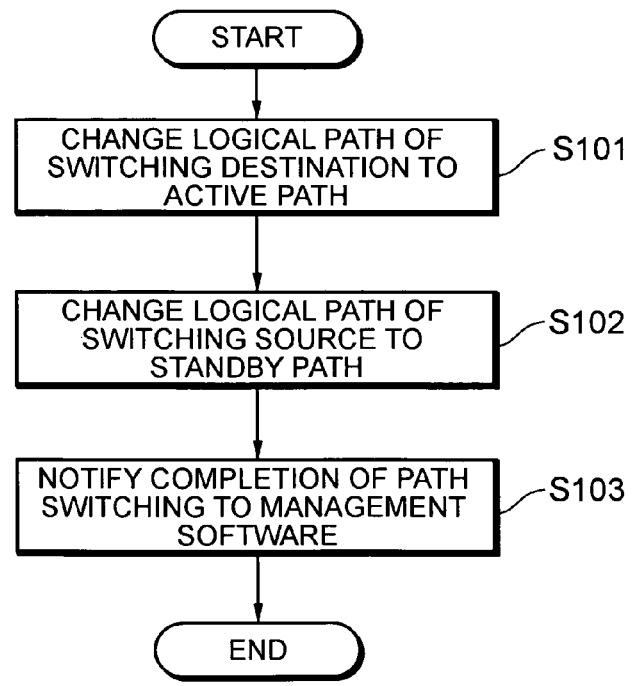
FIG. 19 is a flowchart showing the path switching process between the storage subsystems according to the present embodiment.
Figure 20:
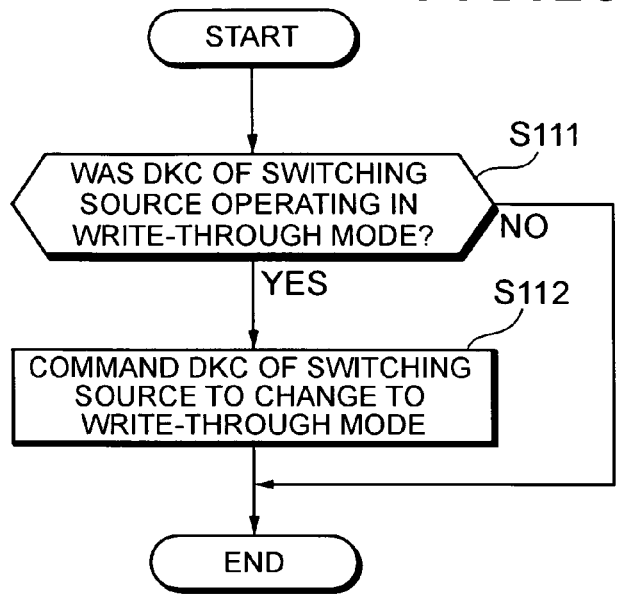
FIG. 20 is a flowchart showing the path switching process between the storage subsystems according to the present embodiment.

FIG. 18 to FIG. 20 are flowcharts describing the path switching process between the storage controllers. As the opportunity to execute path switching processing, for instance, there are cases (1) when the management software 1003 judges that load balancing via path switching is necessary, and (2) when [the management software 1003] receives a path switching request based on a path failure from the path management software 1012. The respective processing steps are now explained in detail below.

FIG. 18 shows the process to be executed by the management software 1003 during the path switching process. The management software 1003 accesses the service processor of the switching source storage subsystem, and checks whether the switching source storage subsystem is operating in a write-through mode (S91).

When the switching source storage subsystem is not operating in the write-through mode (S91; NO), the management software 1003 instructs the service processor of the switching source storage subsystem to change to the write-through mode, and waits for the mode change to be complete (S92). As parameters to be given upon the management software 1003 instructing the service processor of the switching source storage subsystem to change to the write-through mode, there are the user name of the service processor of the switching source storage subsystem, password of the service processor of the switching source storage subsystem, and ID of the switching source storage subsystem.

When the service processor reports to the management software 1003 regarding the completion of change to the write-through mode, the management software 1003 requests a cache flash of the switching source storage subsystem to the service processor of the switching source storage subsystem (S93). As parameters to be given upon the management software 1003 instructing the service processor of the switching source storage subsystem to perform a cache flash, there are the user name of the service processor of the switching source storage subsystem, password of the service processor of the switching source storage subsystem, and ID of the switching source storage subsystem.

When the management software 1003 receives a cache flash completion report after requesting the cache flash to the service processor of the switching source, it requests path switching to the path management software 1012 (S94). As parameters to be given upon the management software 1003 requesting path switching to the path management software 1012, there are the path ID of the logical path of the switching source, path ID of the logical path of the switching destination, user name of the host computer 1008, and password of the host computer 1008.

Even when the switching source storage subsystem is operating in the write-through mode (S91: YES), the management software 1003 will request path switching to the path management software 1012 (S94).

FIG. 19 shows the processing to the executed with the path management software 1012 during the path switching process. After the processing at step S94 described above, when the path management software 1012 receives an instruction from the management software 1003 to perform path switching, the path management software 1012 changes the logical path of the switching destination to an Active path (S101), and changes the logical path of the switching source to Standby path (S102). Thereafter, the path management software 1012 reports the completion of path switching to the management software 1003 (S103).

FIG. 20 shows the processing to be executed by the management software 1003 during the path switching process. After the processing at step S103 described above, the management software 1003 checks whether the switching source storage subsystem is operating in a write-back [mode] (S111). When the switching source storage subsystem is operating in a write-back [mode] (S111: YES), the management software 1003 instructs the service processor of the switching source storage subsystem to change to the write-through mode (S112). When the switching source storage subsystem is not operating in the write-back [mode] (S111: NO), the management software 1003 ends this processing routine.

Figure 21:
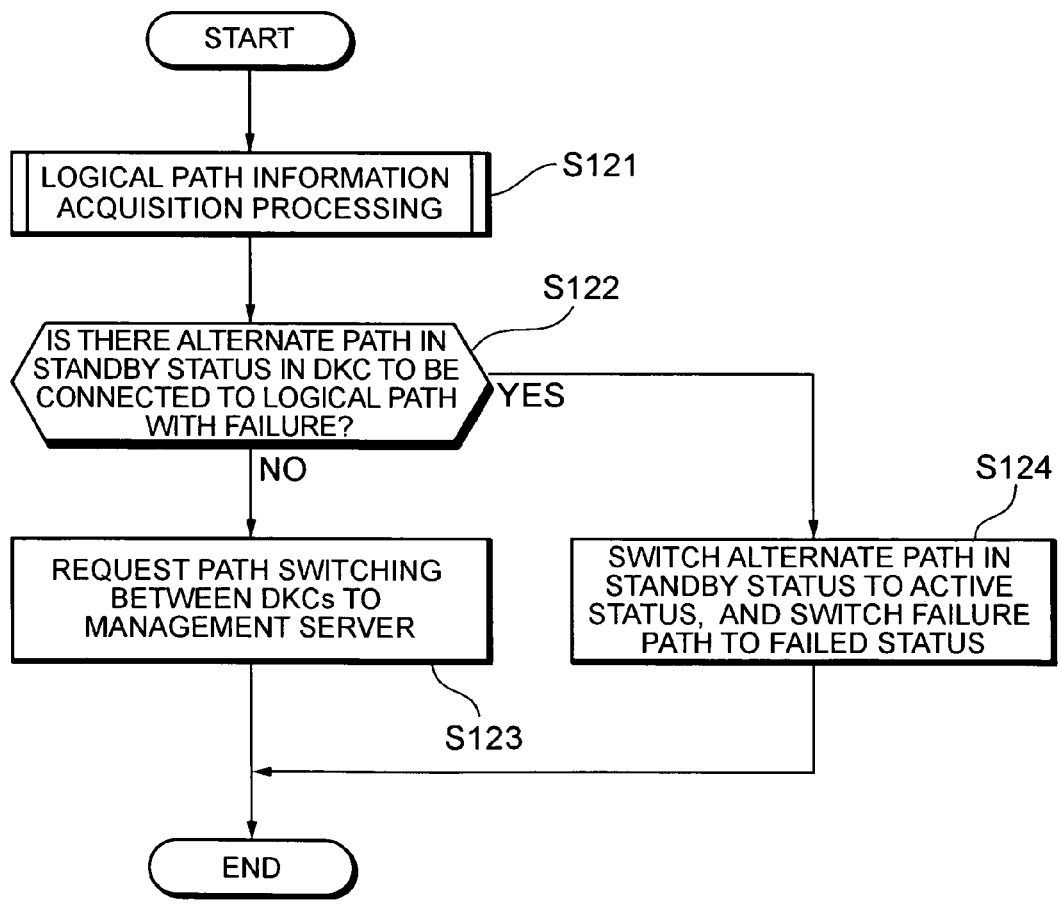
FIG. 21 is a flowchart showing the logical path failure recovery process according to the present embodiment.

FIG. 21 is a flowchart describing the logical path failure recovery process. The logical path failure recovery process is a process for executing path switching when the path management software 1012 detects a failure in the logical path.

When the path management software 1012 detects a failure in the Active path to be connected to the virtual LDEVs 1030, 1042, the path management software 1012 executes the logical path information acquisition process (S121). Details regarding the logical path information acquisition process are as described above (c.f. FIG. 13).

Next, the path management software 1012 checks whether there is an alternate path in a Standby state in a storage subsystem to be connected to a logical path subject to a failure (S122).

If an alternate path in a Standby state does not exist (S122; NO), the path management software 1012 requests the management server 1000 to execute path switching between the storage subsystems (S123). The management server 1000, in response to the path switching request, instructs the path management software 1012 to perform path switching (details regarding the path switching processing are as described above).

Meanwhile, if an alternate path in a Standby state exists (S122; YES), the path management software 1012 switches the alternate path in a Standby state to an Active state, and changes the status of the logical path subject to a failure to Failed (S124).

According to the present embodiment, since it is possible to recognize that the virtual LDEVs 1030, 1042 are virtualizations of the common external LDEV 1055, a certain logical path of either the logical path to be connected to the external LDEV 1055 from the host computer 1008 via the virtual LDEV 1030 and the logical path to be connected to the external LDEV 1055 from the host computer 1008 via the virtual LDEV 1042 can be defined as an alternate path of the other logical path. By appropriate switching the active path according to the work load of the first storage subsystem 1019 and the work load of the second storage subsystem 1032, the work loads of these subsystems can be balanced.

Figure 22:
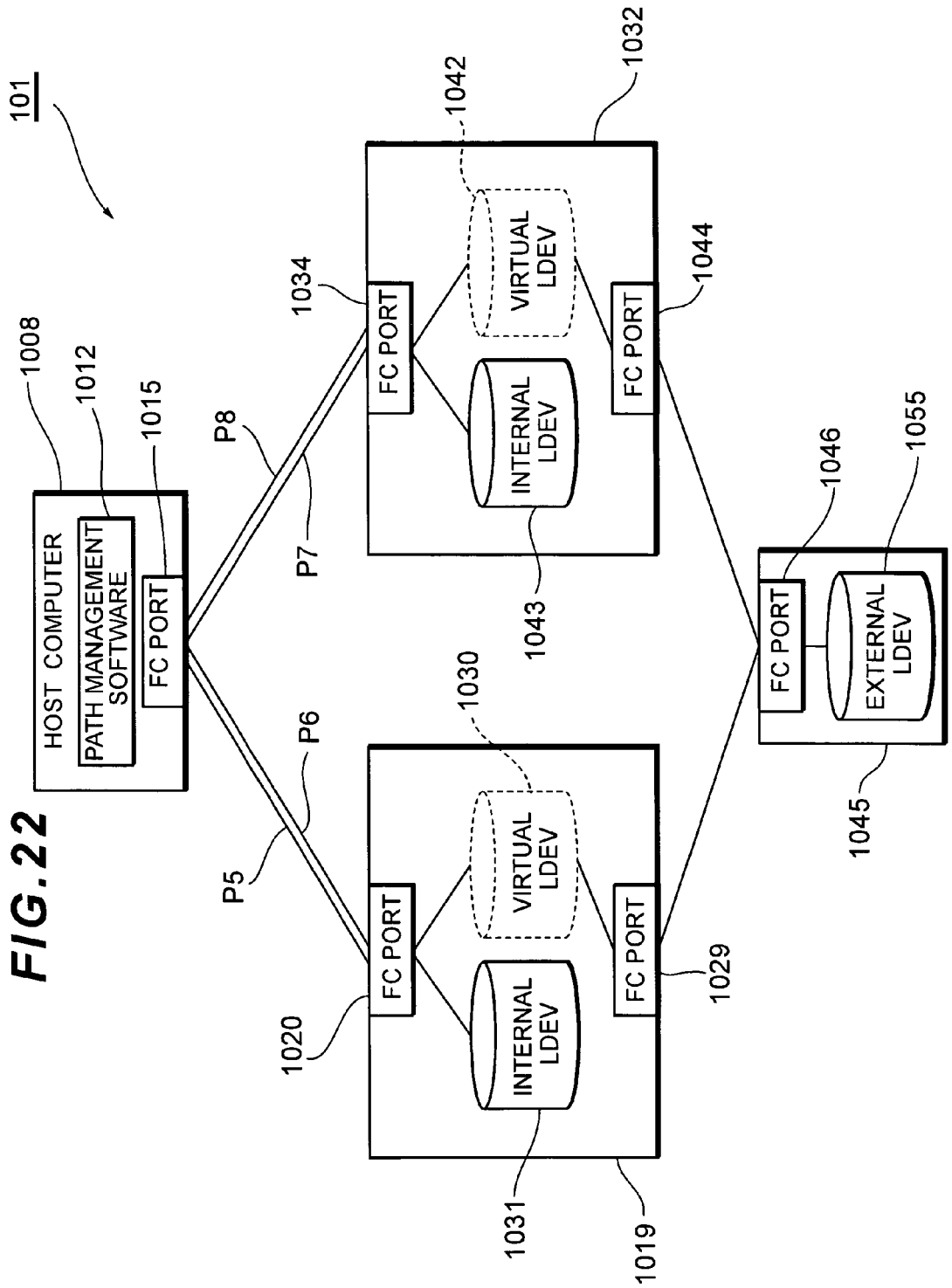
FIG. 22 is a diagram showing another configuration example of the computer system according to the present embodiment.

Incidentally, the present invention is not limited to the foregoing embodiments, and the system configuration of the computer system 100 may be suitably changed. For example, the computer system 101 illustrated in FIG. 22 has a plurality of logical paths P5, P6 between the host computer 1008 and first storage subsystem 1019, and the external LDEV 1055 can be accessed from any one of the logical paths P5, P6 via the virtual LDEV 1030. For instance, considered is a case where the logical path P5 is in an Active state and the logical path P6 is in a Standby state. Assuming that a failure occurred in the logical path P5, while switching the logical path P5 from an Active state to a Standby state on the one hand, by switching the logical path P6 from a Standby state to an Active state, the host computer 1008 will be able to access the external LDEV 1055 via the virtual LDEV 1030. Similarly, the computer system 101 has a plurality of logical paths P7, P8 between the host computer 1008 and second storage subsystem 1032, and is able to access the external LDEV 1055 from any one of the logical paths P7, P8 via the virtual LDEV 1042.

Figure 23:
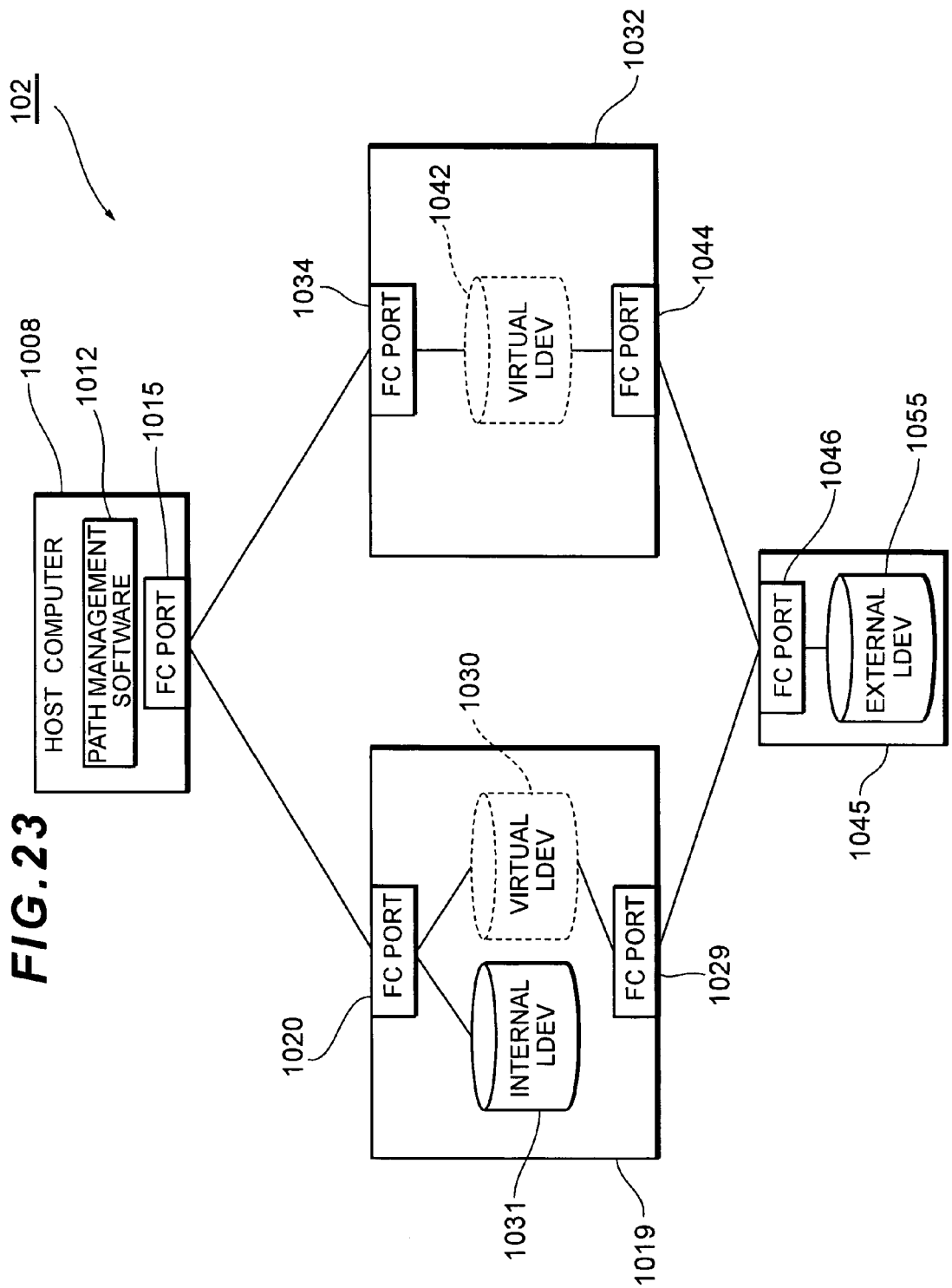
FIG. 23 is a diagram showing another configuration example of the computer system according to the present embodiment.
Figure 24:
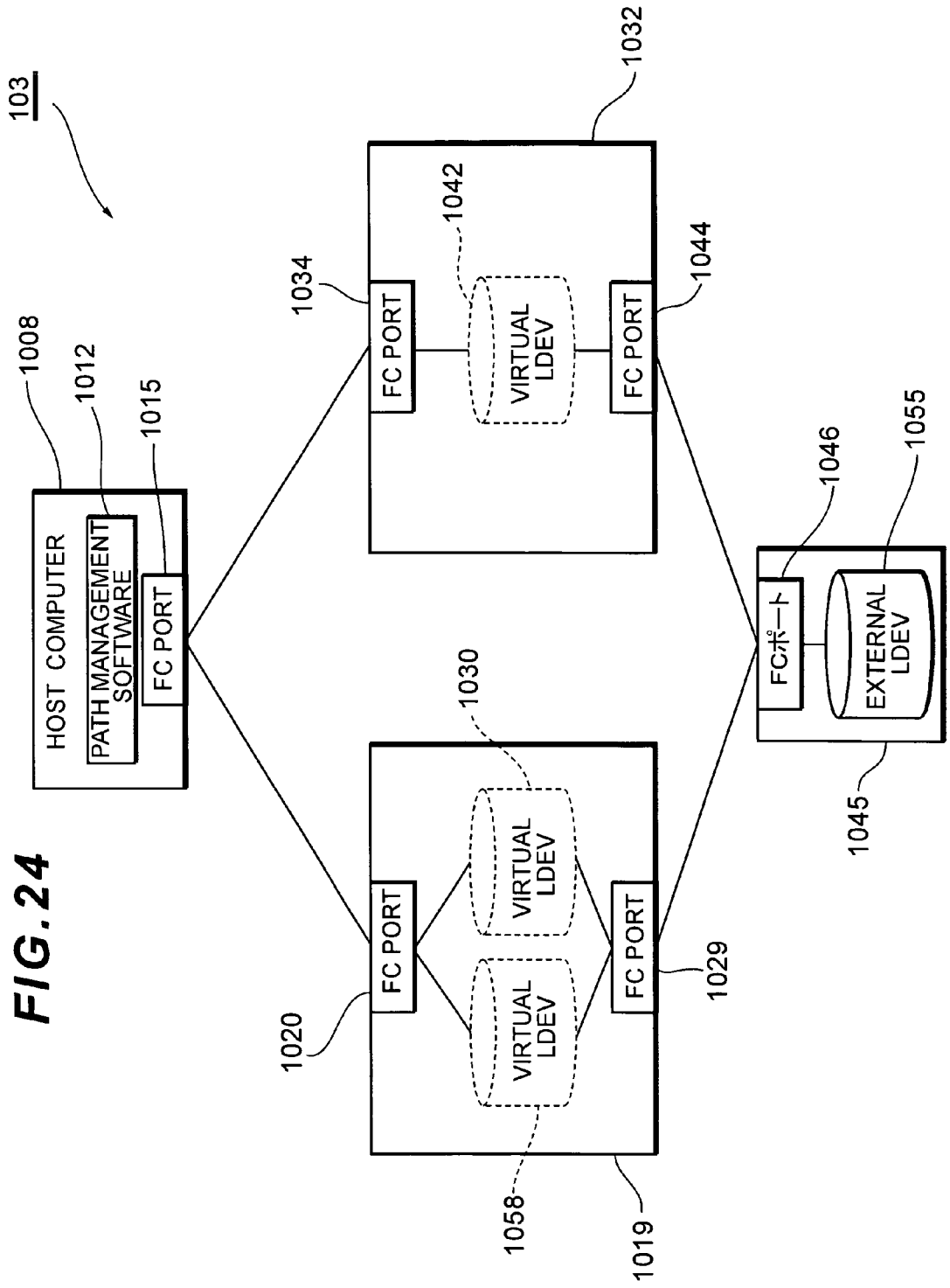
FIG. 24 is a diagram showing another configuration example of the computer system according to the present embodiment.

Further, the intermediate storage subsystem does not necessarily have to have a physical storage device, and, as with a virtualization switch, it may be configured to only have a virtual LDEV. For example, with the computer system 102 depicted in FIG. 23, the second storage subsystem 1032 only has the virtual LDEV 1042, and does not have a physical storage device. With the computer system 103 shown in FIG. 24, both the first storage subsystem 1019 and the second storage subsystem 1032 do not have a physical storage device. The first storage subsystem 1019 has virtual LDEVs 1030, 1058, and the second storage subsystem 1032 has a virtual LDEV 1042. Like this, the intermediate storage subsystem may be a virtualization switch upon employing the present invention.

What is claimed is:

1. A computer system comprising:
   a host computer that requests the input and output of data in and from an actual storage volume; and
   a storage system including a plurality of storage subsystems each of which has actual I/O ports and is configured with at least one corresponding virtual storage volume,
   wherein each virtual storage volume of each of said storage subsystems is mapped into a common external volume but presented to said host computer as an internal storage volume of the corresponding storage subsystem,
   wherein said common external volume is physically located outside of said host computer and said storage subsystems,
   wherein each of said storage subsystems includes at least one actual storage volume physically located therein,
   wherein each actual storage volume of each of said storage subsystems and said common external volume are each assigned with a different globally unique identifier (GUID),
   wherein each virtual storage volume of each of said storage subsystems shares the GUID assigned to said common external volume, and
   wherein said host computer identifies a plurality of logical paths to be respectively connected through each of said virtual storage volumes to said common external volume by scanning for the shared GUID, and sets one of the logical paths to request the input and output of data in and from said common external volume.

2. The computer system according to claim 1, wherein said host computer controls path switching among the plurality of logical paths to be respectively connected through each of said virtual storage volumes to said common external volume so as to balance work load of the corresponding storage subsystems.

3. The computer system according to claim 1, wherein said host computer switches from a failed logical path connecting through a respective storage subsystem connected to said common external volume to another logical path also connecting through the respective storage subsystem to said common external volume.

4. The computer system according to claim 3, wherein said host computer switches from the failed logical path to another logical path to be connected through a different one of said storage subsystems to said common external volume, if there is no logical path available to be connected through the same storage subsystem to said common external volume.

5. An operating method of a storage system including a plurality of storage subsystems each of which has actual I/O ports, comprising:
   configuring each of said storage subsystems with at least one corresponding virtual storage volume;
   mapping each virtual storage volume of each of said storage subsystems into a common external volume while presenting said virtual storage volume to a host computer as an internal storage volume of the corresponding respective storage subsystem, said common external volume being physically located outside of said host computer and said storage subsystems;
   providing at least one actual storage volume in each of said storage subsystems;
   assigning a different globally unique identifier (GUID) to each actual storage volume of each of said storage subsystems and said common external volume;
   assigning each virtual storage volume of each of said storage subsystems to share the GUID assigned to said common external volume;
   identifying by said host computer a plurality of logical paths to be respectively connected through each of said virtual storage volumes to said common external volume by scanning for the shared GUID; and
   setting by said host computer one of the logical paths to request the input and output of data in and from said common external volume.

6. The operating method according to claim 5, further comprising a step of controlling by said host computer path switching among the plurality of logical paths to be respectively connected through each of said virtual storage volumes to said common external volume so as to balance work load of the corresponding storage subsystems.

7. The operating method according to claim 5, further comprising a step of switching by the host computer from a failed logical path connecting through a respective storage subsystem connected to said common external volume to another logical path also connecting through the respective storage subsystem said common external volume.

8. The operating method according to claim 7, further comprising a step of switching by said host computer from the failed logical path to another logical path to be connected through a different one of said storage subsystems to said common external volume, if there is no logical path available to be connected through the same storage subsystem to said common external volume.

9. A load balancing method of a storage system including a plurality of storage subsystems each of which has actual I/O ports, comprising:
   configuring at least one corresponding virtual storage volume of each of said storage subsystems by mapping each virtual storage volume of each of said storage subsystems into a common external volume while presenting said virtual storage volume to a host computer as an internal storage volume of the corresponding storage subsystem, said common external volume being physically located outside of said host computer and said storage subsystems;
   providing at least one actual storage volume in each of said storage subsystems;
   assigning a different globally unique identifier (GUID) to each actual storage volume of each of said storage subsystems and said common external volume;

assigning each virtual storage volume of each of said storage subsystems to share the GUID assigned to said common external volume;

identifying by said host computer a plurality of logical paths to be respectively connected through each of said virtual storage volumes to said common external volume by scanning for the shared GUID;

setting by said host computer one of the logical paths to request the input and output of data in and from said common external volume; and balancing by said host computer work load of the storage subsystems by path switching among the plurality of logical paths to be respectively connected through each of said virtual storage volumes to said common external volume.

10. The operating method according to claim 9, wherein the work load to be balanced includes at least one of cache memory utilization, a number of I/O processing routines of the storage subsystems per unit time, a data transmission volume flowing through the logical paths per unit time, a time period required by the storage subsystems to respond upon receiving an I/O request from the host computer, and a time period required for the storage subsystems to perform I/O processing.

* * * * *